(12) United States Patent
Jones et al.

(10) Patent No.: US 7,285,890 B2
(45) Date of Patent: Oct. 23, 2007

(54) MAGNET RETENTION ON ROTORS

(75) Inventors: Stuart A. Jones, Wrentham, MA (US); Franklin B. Jones, Shrewsbury, MA (US)

(73) Assignee: Comprehensive Power, Inc., Marlborough, MA (US)

( * ) Notice: Subject to any disclaimer, the term of this patent is extended or adjusted under 35 U.S.C. 154(b) by 0 days.

(21) Appl. No.: 11/385,381

(22) Filed: Mar. 21, 2006

(65) Prior Publication Data

US 2006/0220483 A1 Oct. 5, 2006

Related U.S. Application Data

(60) Provisional application No. 60/666,539, filed on Mar. 30, 2005.

(51) Int. Cl.
*H02K 1/27* (2006.01)
*H02K 21/12* (2006.01)

(52) U.S. Cl. .................... 310/156.19; 310/156.16; 310/156

(58) Field of Classification Search ............ 310/180, 310/156.19, 156.01, 156.18, 154.03, 154.08, 310/154.14, 15, 269
See application file for complete search history.

(56) References Cited

U.S. PATENT DOCUMENTS

| | | | | |
|---|---|---|---|---|
| 2,985,779 | A * | 5/1961 | Flaningam et al. .... | 310/156.19 |
| 4,151,431 | A | 4/1979 | Johnson | |
| 4,464,596 | A * | 8/1984 | Miller et al. ........... | 310/156.52 |
| 4,480,207 | A * | 10/1984 | Miller et al. ........... | 310/156.52 |
| 4,510,680 | A * | 4/1985 | Miller et al. ........... | 29/598 |
| 4,845,837 | A | 7/1989 | Lloyd | |
| 4,877,983 | A | 10/1989 | Johnson | |
| 5,036,238 | A * | 7/1991 | Tajima ..................... | 310/214 |
| 5,200,662 | A | 4/1993 | Tagami et al. | |
| 5,402,021 | A | 3/1995 | Johnson | |
| 5,536,984 | A | 7/1996 | Stuart et al. | |
| 5,831,365 | A | 11/1998 | Keim et al. | |
| 5,877,578 | A * | 3/1999 | Mitcham et al. ........... | 310/268 |
| 5,952,755 | A | 9/1999 | Lubas | |
| 5,960,096 | A * | 9/1999 | Imahori et al. ........... | 381/417 |
| 6,105,951 | A * | 8/2000 | Shibata ..................... | 269/99 |
| 6,242,833 | B1 | 6/2001 | Mobius et al. | |
| 6,603,232 | B2 * | 8/2003 | Van Dine et al. ........ | 310/156.01 |
| 6,720,707 | B2 * | 4/2004 | Tamai et al. ........... | 310/323.12 |
| 6,727,628 | B2 | 4/2004 | Shimada et al. | |
| 6,741,010 | B2 * | 5/2004 | Wilkin ..................... | 310/268 |
| 6,847,145 | B2 * | 1/2005 | Van Dine et al. ........ | 310/156.59 |
| 6,984,908 | B2 | 1/2006 | Rinholm et al. | |
| 2003/0049134 | A1 * | 3/2003 | Leighton et al. .......... | 417/40 |
| 2003/0135988 | A1 * | 7/2003 | Pelletta ..................... | 29/605 |
| 2003/0222514 | A1 * | 12/2003 | Van Dine et al. ......... | 310/43 |

(Continued)

FOREIGN PATENT DOCUMENTS

DE 3239279 A1 * 5/1984

(Continued)

*Primary Examiner*—Darren Schuberg
*Assistant Examiner*—Ondria Garner
(74) *Attorney, Agent, or Firm*—Guerin & Rodriguez, LLP

(57) ABSTRACT

Permanent magnets are mounted on a rotor of an electrical motor by an apparatus that keeps an adhesive bonding layer between the magnet and rotor in compression over wide variations in temperature and speed of rotation. The mechanical stresses on the magnets are controlled using compliant layers and spacers. The apparatus allows the removal and replacement of individual magnets.

13 Claims, 6 Drawing Sheets

U.S. PATENT DOCUMENTS

2004/0150283 A1* 8/2004 Calfo et al. ............ 310/156.55
2005/0184611 A1    8/2005 Rinholm et al.
2005/0264122 A1   12/2005 Domeki et al.

FOREIGN PATENT DOCUMENTS

| JP | 08116634 A  | * | 5/1996 |
| JP | 09023599 A  | * | 1/1997 |
| JP | 2000107970 A | * | 4/2000 |
| JP | 2001069703 A | * | 3/2001 |
| JP | 2006296020 A | * | 10/2006 |

* cited by examiner

MAGNET RETENTION ON ROTORS

This application claims the benefit of the filing date of U.S. Provisional Application; Ser. No. 60/666,539; filed Mar. 30, 2005; entitled "Method and Apparatus for Retention of Magnets on a Permanent Magnet Motor Rotor," the entirety of which provisional application is incorporated herein by reference.

FIELD OF THE INVENTION

The present invention relates generally to permanent magnet motors. More particularly, the present invention relates to retaining magnets on rotors useful in permanent magnet motors.

BACKGROUND OF THE INVENTION

A permanent magnet motor consists of a wound stator within which a rotor rotates. Permanent magnets are attached to the rotor to produce alternating north and south magnetic fields that interact with electrical current through the stator to produce torque. The permanent magnets are attracted to the steel core of the rotor, but the centrifugal force created by the rotation of the rotor tends to pull the magnets off of the rotor.

Magnet retention is difficult, involving several factors. First, the magnets are brittle ceramics and structurally weak. Second, the centrifugal forces are high, especially with very high-speed rotors. Third, radial space (i.e., the space between the rotor and the stator) is at a premium because the magnetic field weakens as the radial separation between the rotor and stator increases. Fourth, permanent magnet motors frequently are required to operate in environments spanning a wide range of temperatures and the rates of thermal expansion of the components of the rotor may differ substantially over the temperature range.

Many methods have been proposed to retain magnets on rotors. Magnets can be bonded to the surface of the rotor, and then held in place by an outer wrap of high-strength material such as glass or carbon fiber, typically with an encapsulant filling the spaces between magnets. These methods have a drawback in that the thickness of the wrap reduces the mechanical clearance (i.e., the radial space) between the stator and rotor. Also, the expansion rate of the wrap under tension and temperature makes it difficult to keep the adhesive bond in compression at high rotational speed. In the absence of compression the adhesive bond can peel, which then allows the magnets to move axially. Finally, since these approaches depend on the integrity of the outer wrap, it is not feasible to repair or replace a magnet after the rotor has been built. The prior art teaches a similar method without the outer wrap. This approach eliminates the radial thickness penalty of the approaches described above, but relies totally on the encapsulant and bond for retention.

Another prior art approach teaches a detachable magnet carrier to hold the magnets. Essentially, the magnets are packaged in a stainless steel box that provides structural strength. This is an expensive approach, and the thickness of the box subtracts from the radial clearance between the rotor and stator.

Magnets can also be contained inside of the rotor, such that the rotor structure retains the magnets. Interior magnet constructions require compromises in the magnetic circuit that reduce performance in some applications.

Accordingly, there still exists a need in industry for a magnet mounting method and structure that places the magnets on the surface of the rotor, using a minimal radial thickness of structural material, so that the performance of the magnetic circuit is maximized. Further, the mounting should maintain compression on the magnets under a wide range of rotational speed and temperature, avoiding excessive mechanical stress on the brittle ceramic magnets. Finally, the mounting should allow the replacement of individual magnets after the rotor has been built.

SUMMARY OF THE INVENTION

In one aspect the present invention embodies a retainer for holding a magnet to a rotor. Magnet retainers of the present invention generally include a retainer body having an opening to accept a fastening device to secure the retainer body to the rotor and an angled surface adapted for engaging an angled surface of a magnet when the retainer body is secured to the rotor; a fastening device disposed in the opening to secure the retainer body to the rotor; and a spring mechanism disposed in the opening between the fastening device and the retainer body to provide a force reactive to a centrifugal force during rotation of the rotor.

In a second aspect, the present invention embodies a rotor useful in a permanent magnet motor. Rotors of the present invention generally include a rotor body having a cylindrical surface having a circumference; a plurality of magnets disposed on the substantially cylindrical surface at equal intervals around the circumference, each magnet having an angled surface; an adhesive layer disposed between each magnet and the cylindrical surface; and a plurality of magnet retainers, each magnet retainer disposed between a neighboring pair of the magnets, each retainer including a retainer body having an opening to accept a fastening device to secure the retainer body to the rotor body and having an angled surface engaging the angled surface of one of the magnets; a fastening device disposed in the opening, the fastening device securing the retainer body to the rotor body; and a spring mechanism disposed between the fastening device and the retainer body to provide a force reactive to a centrifugal force during rotation of the rotor body.

In a third aspect, the present invention embodies a rotor useful in a permanent magnet motor that includes a rotor body having a cylindrical surface having a circumference; a plurality of magnets disposed on the cylindrical surface at equal intervals on the circumference, each magnet having an angled surface; an adhesive layer disposed between each magnet and the rotor body; an open-mesh screen disposed between each magnet and the cylindrical surface; a plurality of magnet retainers, each magnet retainer disposed between a neighboring pair of the magnets, each magnet retainer including a retainer body having an opening to accept a fastening device to secure the retainer body to the rotor body and having an angled surface engaging the angled surface of one of the magnets; a fastening device at least partially disposed in the opening, the fastening device securing the retainer body to the rotor body; and a spring mechanism disposed between the fastening device and the retainer body to provide a force reactive to a centrifugal force during rotation of the rotor body; and a plurality of axial retainers, each axial retainer disposed at an end of a magnet retainer, the axial retainers adapted to prevent axial movement of a magnet.

In a fourth aspect, the present invention embodies a method for retaining magnets on a rotor. Methods of the present invention generally include attaching magnets, having an angled surface, to a cylindrical surface of the rotor body using an adhesive layer; positioning retainer bodies, having angled surfaces, each retainer body positioned between a neighboring pair of the magnets on the cylindrical surface such that the angled surfaces of the retainer bodies engage the angled surfaces of the magnets; and securing the retainer bodies to the rotor body. Preferred embodiments include one or more of the following: positioning a spacer between each magnet and the cylindrical surface, such that the spacer shares the same volume as the adhesive layer; positioning a compliant layer between the angled surfaces of the retainer bodies and the angled surfaces of the magnets; and positioning a spring mechanism between the retainer bodies and fastening devices used to secure the retainer bodies.

BRIEF DESCRIPTION OF THE DRAWINGS

The above and further advantages of this invention may be better understood by referring to the following description in conjunction with the accompanying drawings, in which like numerals indicate like structural elements and features in the various figures. The drawings are not meant to limit the scope of the invention. For clarity, not every element may be labeled in every figure. The drawings are not necessarily to scale, emphasis instead being placed upon illustrating the principles of the invention.

DETAILED DESCRIPTION OF THE INVENTION

Figure 1:
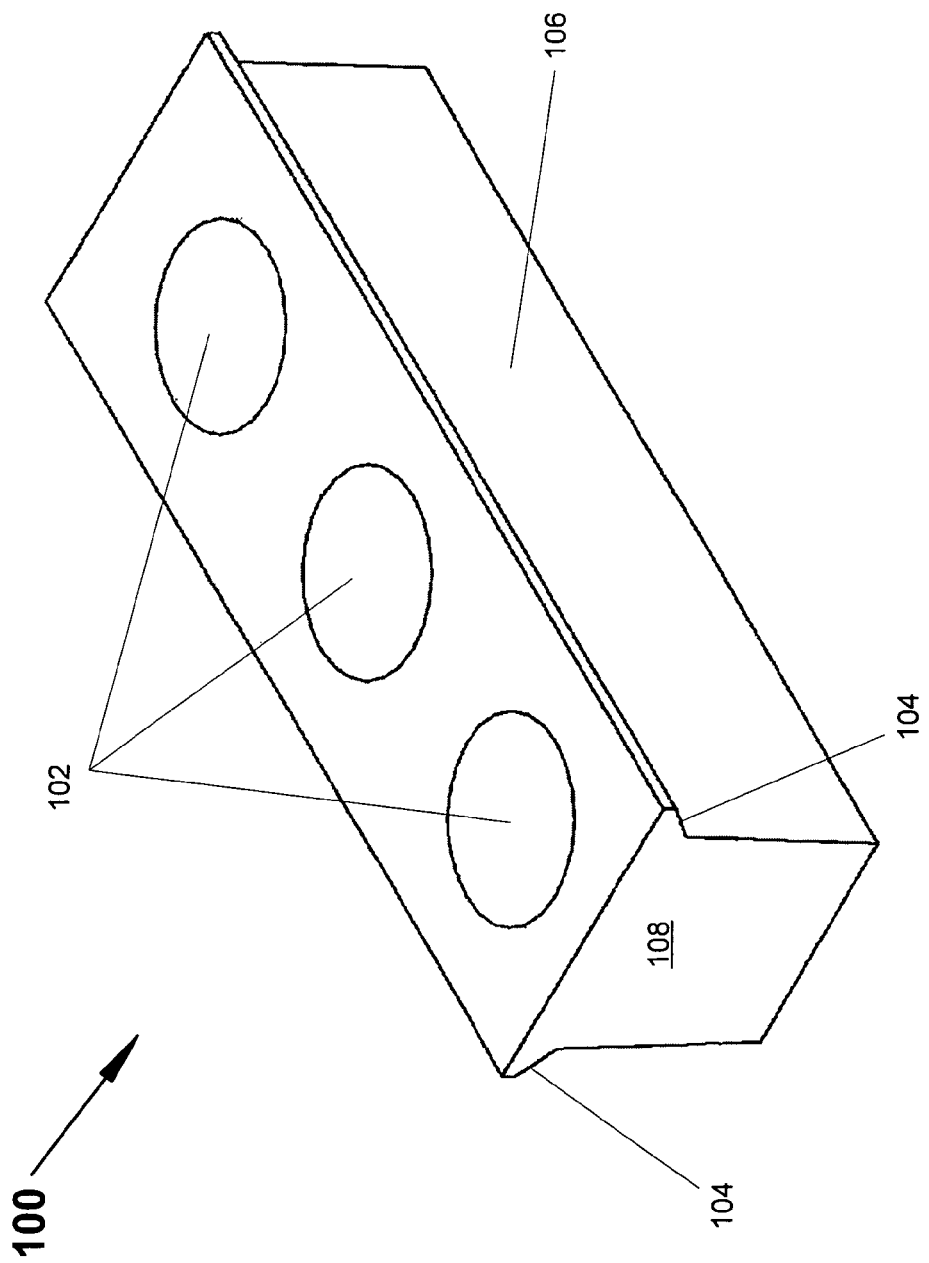
FIG. 1 illustrates a retainer body of a magnet retainer in accordance with an embodiment of the present invention.

The present invention provides for improved retention of magnets on rotors useful in permanent magnet motors. In accordance with the present invention, magnet retainers are advantageously utilized to aid in retaining magnets onto a rotor body that has a cylindrical surface. The magnets are disposed on the cylindrical surface at equal intervals around the circumference of the cylindrical surface. An adhesive layer is disposed between the magnet and the cylindrical surface. Magnet retainers are disposed between each pair of magnets and secured to the rotor body. The magnet retainers are secured to the rotor body in a manner that applies a centripetal force on the magnets, pulling the magnets down onto the cylindrical surface of the rotor body in a manner that exerts a compressive force on the adhesive layer even at the highest rotational speeds at which the rotor is used. Spring mechanisms are used to counter centrifugal force on the magnets during use (i.e., rotation of the rotor) and maintain this compressive force. Axial retainers can be used to prevent axial movement of the magnets upon failure of the adhesive layer.

Rotor bodies useful in permanent magnet motors are generally well known in the art. They have a cylindrical surface and rotate about an axis within a stator. The rotor body is typically made of steel, although the present invention may be advantageously used with rotor bodies made of other materials. In a preferred embodiment, features are created in the cylindrical surface at equal intervals around the circumference of the cylindrical surface. Thus, the phrase cylindrical surface as used herein refers to a surface that may have features as herein described and does not necessarily refer to, but may include, a surface that is cylindrical in a mathematically precise meaning. The intervals are preferably as precisely equal as can feasibly be made. The features are shaped such that placing magnets into the features helps properly locate and align the magnets. The manner of creating the features is not particularly critical to the present invention. A preferred method for creating the features is to cut the features into the surface.

Magnets are attached to the rotor body at equal intervals around the circumference of the cylindrical surface. Several magnets may be attached at different axial positions at the same radial position, in effect forming a longer magnet. In preferred embodiments, the magnets are placed into features in the cylindrical surface. The magnets are attached to the rotor body by a layer of adhesive. The adhesive layer is disposed between the cylindrical surface (in the feature, if present) and the magnet. Preferably, a spacer is also positioned between the cylindrical surface and the magnet, sharing the same volume as the magnet. The spacer ensures that the compressive force on the adhesive layer does not reduce the thickness of the adhesive layer to below a minimum thickness needed for the adhesive layer to perform acceptably. In a preferred embodiment, the spacer comprises an open-mesh screen. The optimum thickness of the adhesive layer may vary from one embodiment to another, depending on the size of the magnets and the particular adhesive being used. However, the needed thickness of the adhesive layer can be determined without undue experimentation by one of ordinary skill in the art of adhesive technology. Adhesives generally have good strength in shear, to resist axial movement, but have much less strength in peel, to resist radial movement away from the rotor body.

Magnet retainers are inserted between each pair of magnets separated by an angular interval. The magnets on each side of a magnet retainer are collectively referred to herein as a neighboring pair of magnets. The magnet retainers comprise a retainer body having an angled surface adapted for engaging an angled surface of a magnet when the retainer body is secured to the rotor body. In preferred embodiments, the retainer bodies are made of stainless steel. By engage, it is herein meant that the angled surfaces of the magnet retainers press down on the angled surfaces on the magnets, exerting a centripetal force on the magnets that pulls the magnets down onto the rotor, which exerts a compressive force on the adhesive layer. In preferred embodiments, the body of each magnet retainer comprises two angled surfaces with each angled surface engaging an angled surface on one of the neighboring pair of magnets. The length and angle of the engaged angled surfaces are selected to keep the mechanical stress within the magnets to an acceptably low level. In preferred embodiments, a compliant layer is positioned between the magnet's angled surface and the angled surface of the retainer body. The compliant layer can assist in distributing the centripetal force more uniformly across the angle surfaces, limiting the contact stress concentrations. The compliant layer in preferred embodiments comprises an epoxy coating. In one preferred embodiment, the compliant layer consists essentially of an epoxy coating on the angled surface(s) of each magnet.

The retainer body of a magnet retainer has an opening to accept a fastening device to secure the retainer body to the rotor. Retainer bodies typically have a plurality of such openings. The fastening device is disposed in the opening and secures the retainer body to the rotor body. In a preferred embodiment, the fastening device is a threaded bolt. The bolt is disposed in the opening of the retainer body and screwed into the rotor body, securing the retainer body, and therefore the magnets, to the rotor body. The bolts may be referred to as radial bolts as they exert a centripetal force on the retainer body, which exerts a centripetal force on at least one magnet of a neighboring pair of magnets. The bolts can be advantageously secured by safety lock wiring at a radially inward end.

An individual magnet can be removed by removing the two magnet retainers on either side of the magnet, and then peeling the magnet away from the rotor, breaking the adhesive bond. A new magnet can be installed by the same process used in initial construction.

FIG. 1 illustrates a retainer body 100 of a magnet retainer. The retainer body 100 has three openings 102 for accepting fastening devices. The shape of the openings 102 in the retainer body 100 are cylindrical because the retainer body 100 is designed for use with bolts as fastening devices. The retainer body also has two angled surfaces 104, one on each side 106 of the retainer body 102 for engaging angled surfaces of neighboring magnets (not shown). FIG. 1 also shows one end 108 of the retainer body 100.

The effect of the centripetal force (provided by the fastening device) holding the magnet retainers and magnets in place and producing the compressive force on the adhesive layer may be lessened during operation of the rotor. For example, the centrifugal force exerted on the retainers and magnets at high rotation speeds can be extreme. The centrifugal force is exerted in the opposite direction of the centripetal force, and therefore diminishes the effect of the centripetal force. Additionally, the rotors are typically designed to work in different environments that can result in significantly different operating temperatures. Thermal expansion and contraction caused by different operating temperatures can reduce the centripetal force. Changes in both the centripetal and centrifugal forces during different operating conditions can induce peel stresses on the adhesive layer and may cause some radial deflection of the magnets.

Magnet retainers of the present invention utilize a spring mechanism to maintain the centripetal force, and therefore the compressive force, at high rotation speeds and at varying operating temperatures. The spring mechanism is disposed between the fastening device and the retainer body and provides a force reactive to a centrifugal force during rotation of the rotor body. If centrifugal force causes radial deflection of a magnet retainer, the spring mechanism will tend to compress and exert a centripetal force on the magnet retainer, countering the centrifugal force. In a preferred embodiment, the spring mechanism comprises at least one disc spring (also referred to as Belleville Washers), such as the disc springs available from Belleville Springs, Ltd of the United Kingdom. The disc springs can be used in parallel or series combinations to obtain a desired spring constant.

Figure 2:
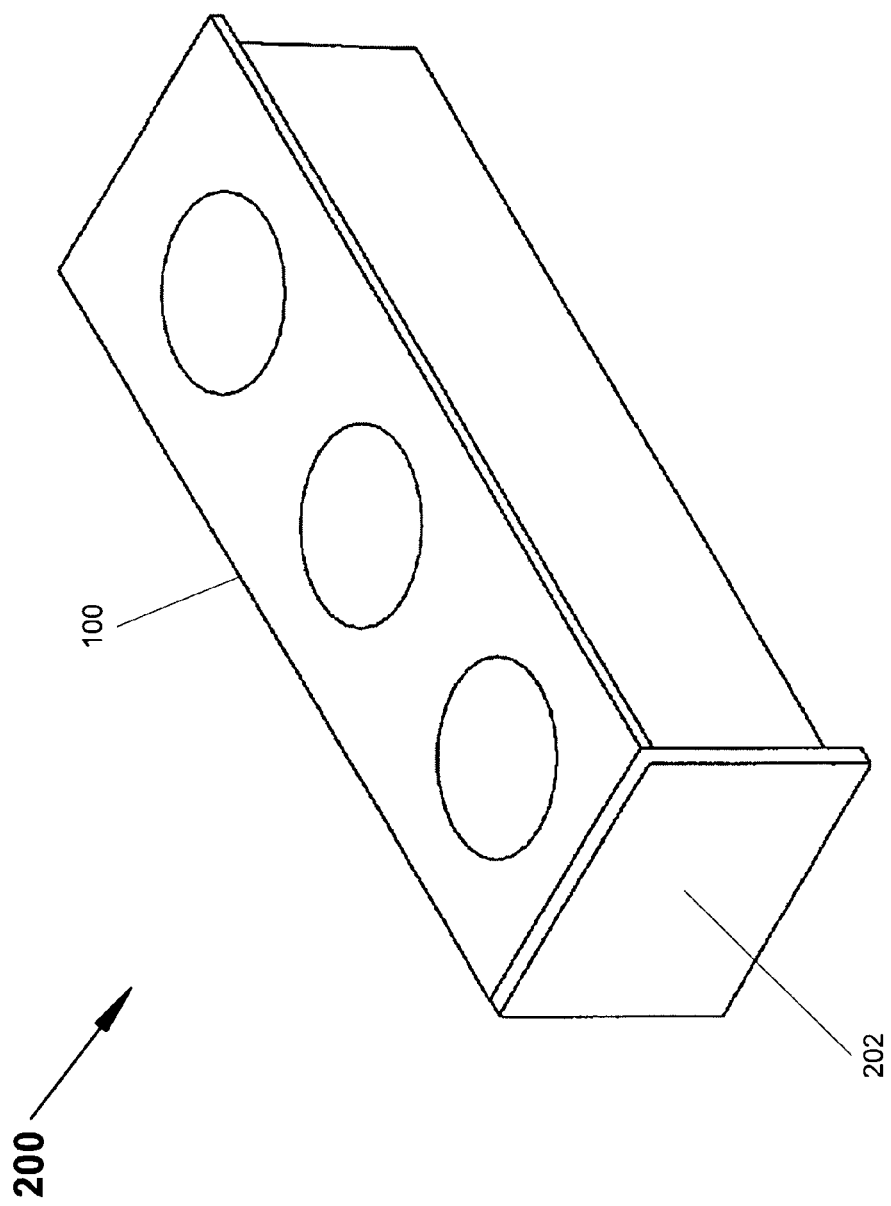
FIG. 2 illustrates the retainer body of FIG. 1 with an axial retainer secured to an end of the retainer body.

In preferred embodiments, axial retainers are disposed at an end of a magnet retainer to prevent axial movement of the magnets if the adhesive bond fails. In one preferred embodiment, the axial retainers are flat plates welded to the ends of magnet retainers. The plates extend beyond the edge of the magnet retainer and block the magnet from axial movement. FIG. 2 illustrates an embodiment 200 of the present invention comprising the retainer body 100 of FIG. 1 with an axial retainer 202 secured to the end 108 of the retainer body 100. The axial retainer 202 covers the end 108 of the retainer body 100 such that it can not be seen in FIG. 2.

Figure 3:
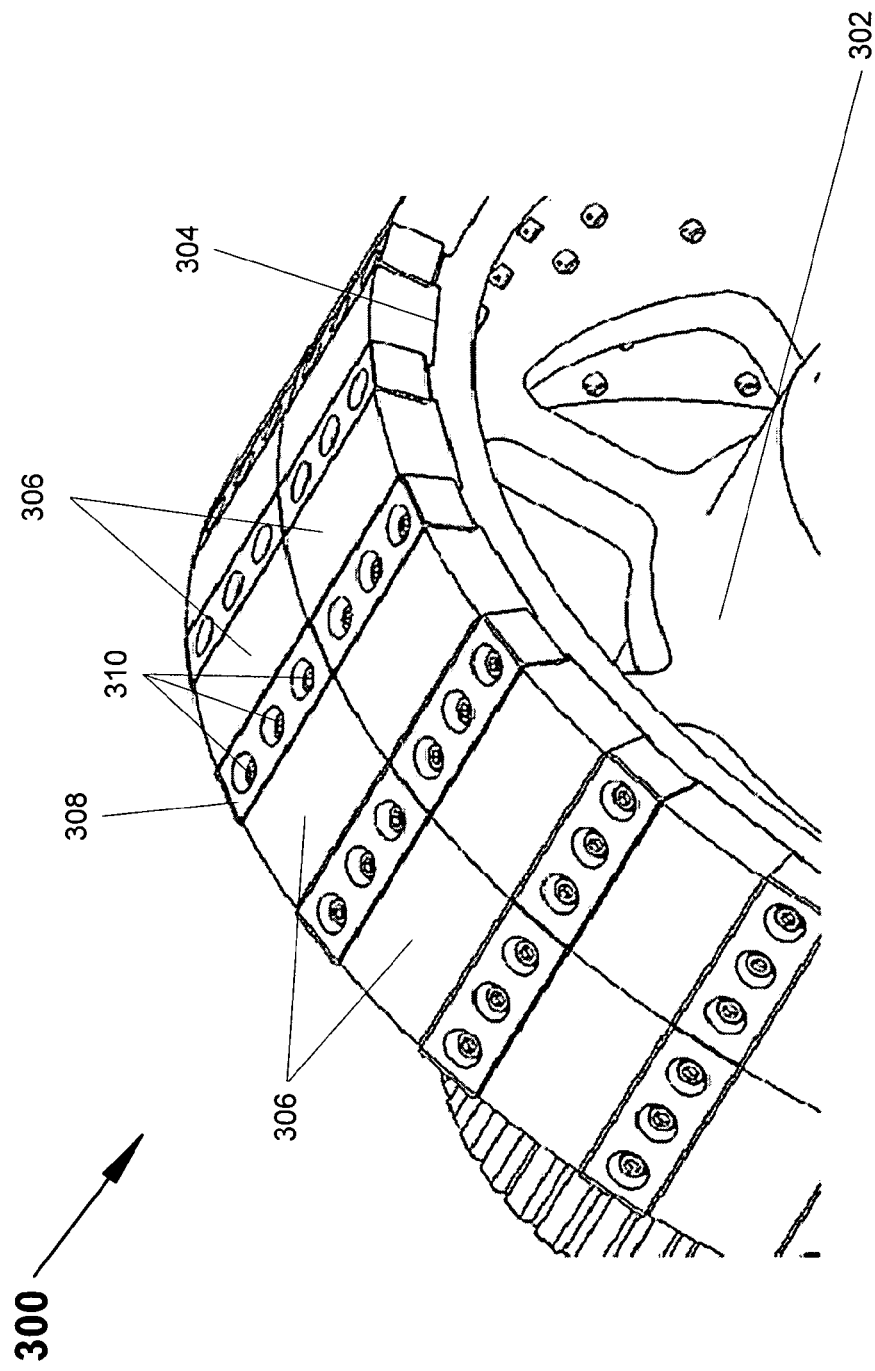
FIG. 3 shows an isometric view of a portion of a rotor in accordance with an embodiment of the present invention.

FIG. 3 shows an isometric view of a rotor 300 in accordance with the present invention. The rotor 300 comprises a rotor body 302 having a cylindrical surface 304. Magnets 306 are attached to the rotor body 302 at equal intervals around the circumference of the cylindrical surface 304. In FIG. 3, two magnets 306 are attached at different axial positions at the same radial position, in effect forming a longer magnet. Each pair of magnets 306 has a magnet retainer 308 disposed between the magnets 306. Two magnet retainers 308 are secured at different axial positions at the same radial position, in effect forming a longer retainer. Each magnet retainer 308, in FIG. 3, is secured to the rotor body 302 with three bolts 310.

Figure 4:
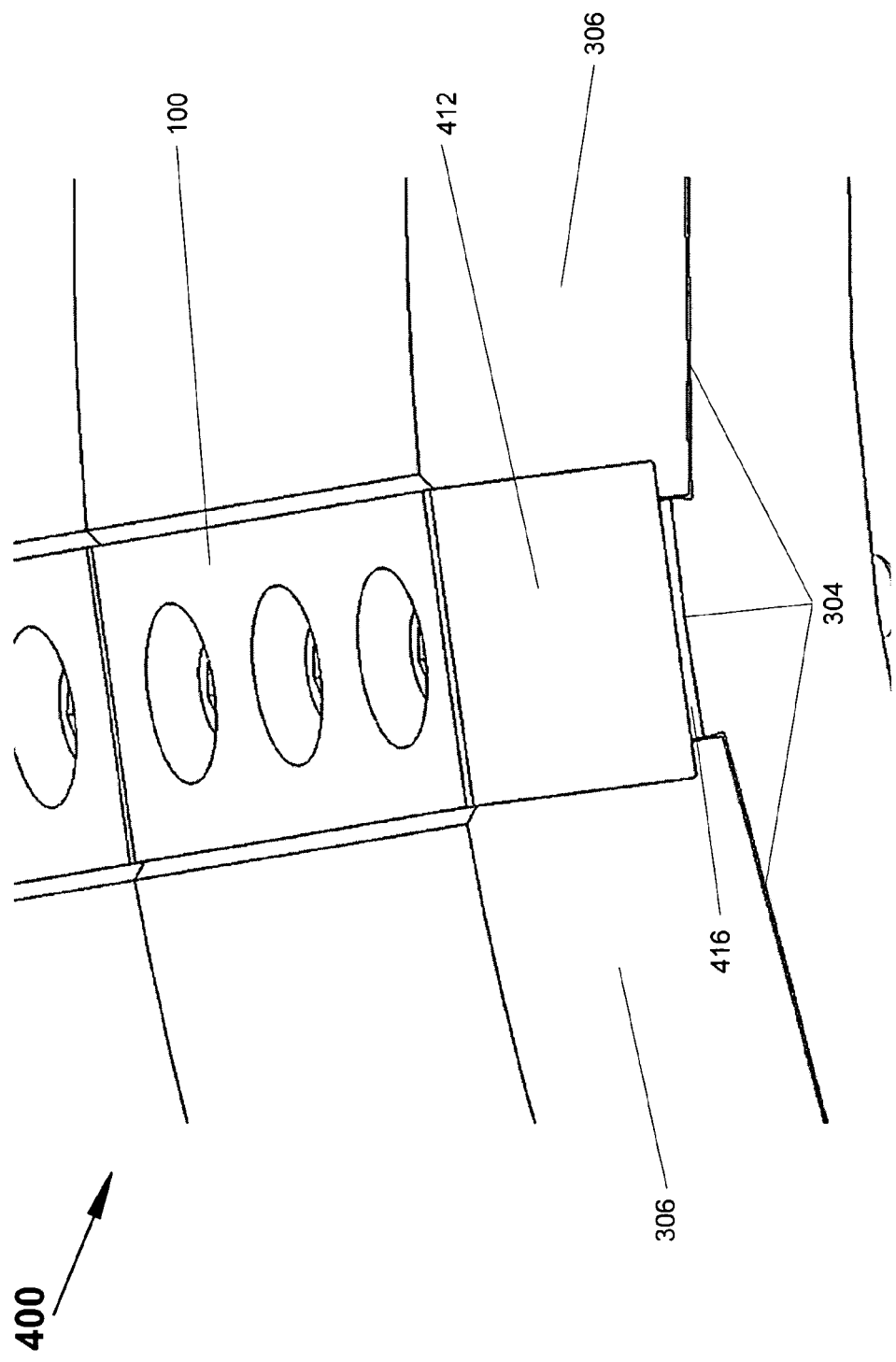
FIG. 4 shows a close-up view of a magnet retainer on the cylindrical surface of the rotor of FIG. 3.

FIG. 4 shows a close-up view 400 of a magnet retainer 308 on the cylindrical surface 304 of the rotor body 302 of FIG. 3. The magnets 306 are disposed into features in the cylindrical surface 304. An axial retainer 412 is secured to an end of the retainer body 108, extending beyond the edges of the magnets 306, and preventing movement of the magnets 306 in an axial direction. FIG. 4 also shows a gap 416 between the retainer body and the cylindrical surface 304. In preferred embodiments, the magnet retainers do not exert any centripetal force directly onto the cylindrical surface. Designing the magnet retainer such that a gap exists between the retainer body and the cylindrical surface ensures that no centripetal force can be exerted by the retainer body directly onto the cylindrical surface. In this manner, all centripetal force on a retainer body is exerted onto the magnets via the engaged angled surfaces.

Figure 5:
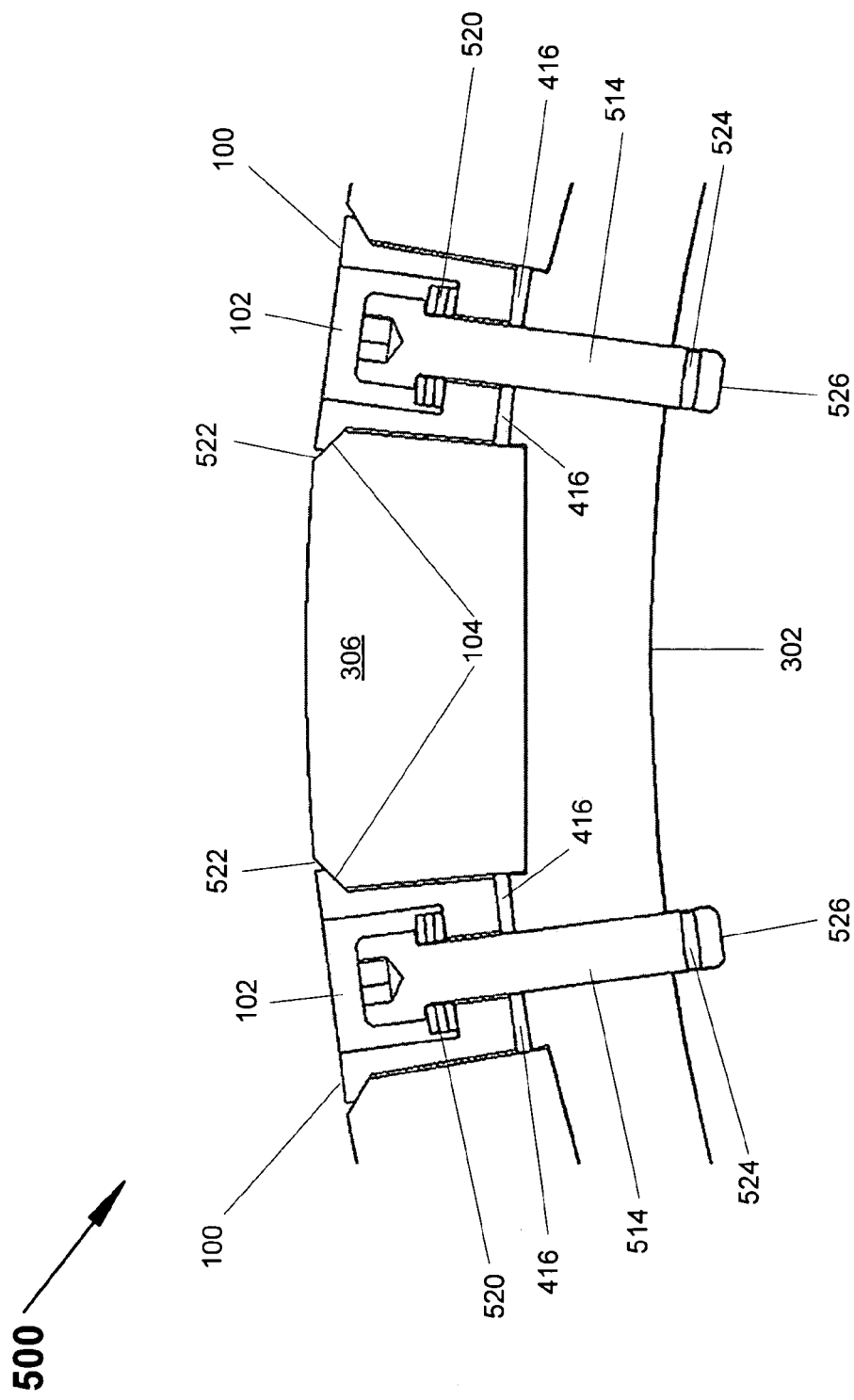
FIG. 5 shows a cross-sectional view of the rotor of FIG. 3.

FIG. 5 shows a cross-sectional view 500 of the rotor 300 of FIG. 3. The view 500 shows two retainer bodies 100, at two different radial positions, on each side of a magnet 306. The retainer bodies 100 are secured to the rotor body 302 using bolts 514 that are disposed in openings 102 of the retainer body 100. Spring mechanisms 520 are disposed between the bolts 514 and the retainer body 100. Angled surfaces 104 on the retainer body 100 engage angled surfaces 522 on the magnet 306. The bolts 514 have openings 524 at the radially inward ends 526 of the bolts 514 for use with safety lock wiring (not shown), which can advantageously aid in securing the bolt 514 to the rotor body 302.

Figure 6:
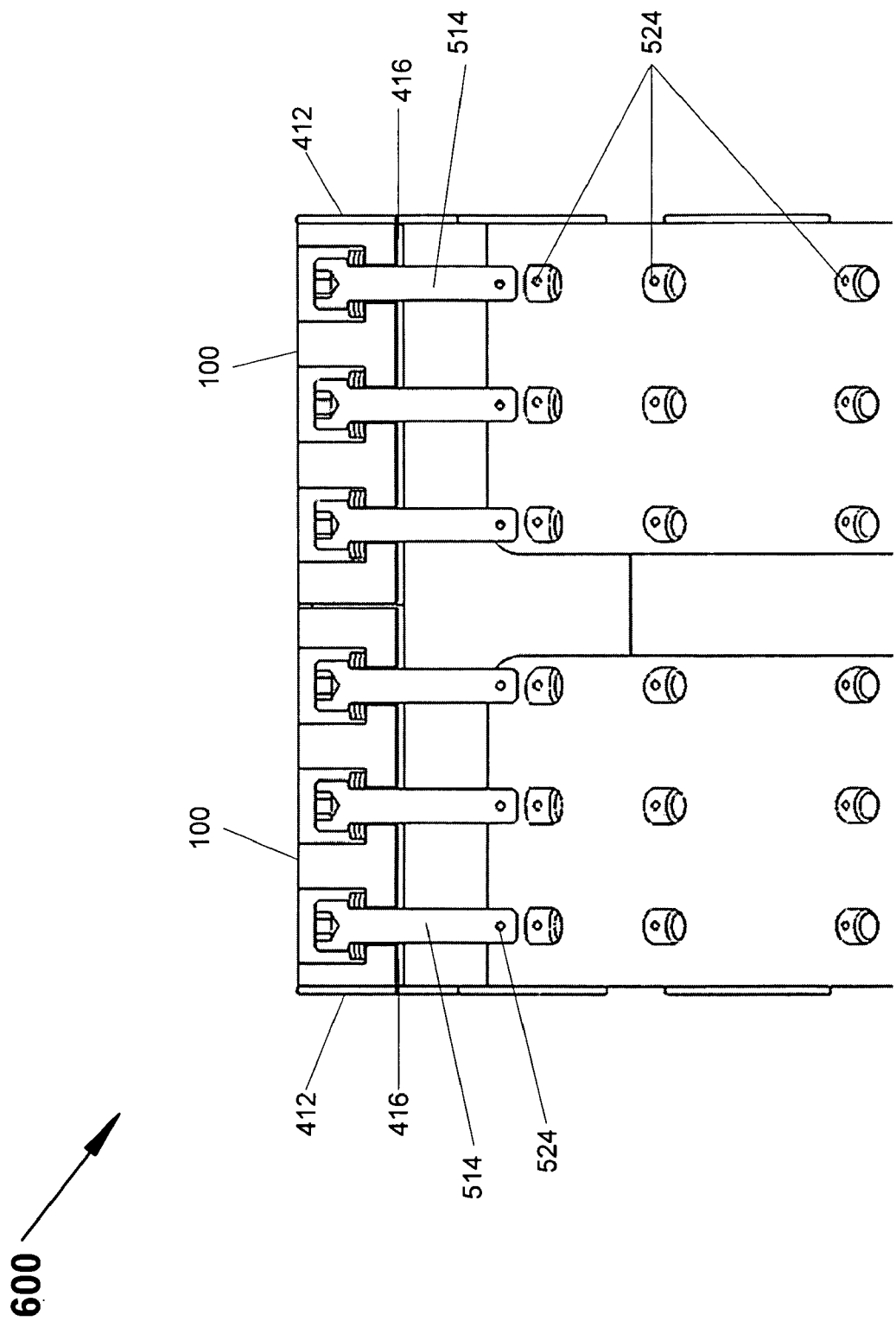
FIG. 6 shows another cross-sectional view of the rotor of FIG. 3.

FIG. 6 shows another cross-sectional view 600 of the rotor 300 of FIG. 3. This view 600 shows two magnet retainers 308 at different axial positions of the same radial position of the rotor 300. The view 600 is a cross-section view through the length of the magnet retainers 308 so the magnets 306 are not shown in FIG. 6. Each retainer body 108 has an axial retainer 412 at one end.

In accordance with the present invention, novel means and methods for retaining magnets on rotors have been provided. While the present invention has been shown and described herein with reference to specific embodiments thereof, it should be understood by those skilled in the art that variations, alterations, changes in form and detail, and equivalents may be made or conceived of without departing from the spirit and scope of the invention. Accordingly, the scope of the present invention should be assessed as that of the appended claims and by equivalents thereto.

What is claimed is:

1. A magnet retainer for securing permanent magnets to a rotor body, comprising:
    a retainer body having an opening and a pair of angled surfaces each adapted to engage an angled surface of a neighboring permanent magnet;
    a fastening device disposed in the opening and adapted to engage the rotor body and thereby radially secure the retainer body to the rotor body; and a spring mechanism disposed between the fastening device and the retainer body to exert a force on the neighboring permanent magnets, the force being responsive to a centrifugal force during rotation of the rotor body.

2. The retainer of claim 1, wherein the fastening device is a threaded bolt.

3. The retainer of claim 1, wherein the spring mechanism comprises at least one disc spring.

4. The retainer of claim 1, further comprising at least one axial retainer secured to an end of the retainer body, the axial retainer adapted to prevent axial movement of a permanent magnet.

5. A permanent magnet rotor, comprising:
a rotor body having a cylindrical surface and a circumference;
a plurality of permanent magnets disposed on the cylindrical surface at equal intervals of the circumference, each permanent magnet having a pair of angled surfaces;
an adhesive layer disposed between each permanent magnet and the cylindrical surface; and
a plurality of magnet retainers, each magnet retainer disposed between a neighboring pair of the permanent magnets, each magnet retainer comprising:
a retainer body having an opening and a pair of angled surfaces each configured to engage one of the angled surfaces of a respective one of the permanent magnets;
a fastening device disposed in the opening and adapted to engage the rotor body to thereby secure the retainer body to the rotor body; and
a spring mechanism disposed between the fastening device and the retainer body, the spring mechanism exerting a force to secure a respective one of the neighboring pairs of permanent magnets to the cylindrical surface of the rotor body, the force being responsive to a centrifugal force during rotation of the permanent magnet rotor.

6. The permanent magnet rotor of claim 5, further comprising a plurality of axial retainers, each axial retainer disposed at an end of a magnet retainer, the axial retainers adapted to prevent axial movement of a permanent magnet.

7. The permanent magnet rotor of claim 5, further comprising a spacer disposed between each permanent magnet and the rotor body.

8. The permanent magnet rotor of claim 7, wherein the spacer is an open-mesh screen.

9. The permanent magnet rotor of claim 5, further comprising a compliant layer between one of the angled surfaces of each retainer body and one of the angled surfaces of a respective one of the permanent magnets.

10. The permanent magnet rotor of claim 5, wherein the fastening device is a threaded bolt.

11. The permanent magnet rotor of claim 5, wherein the spring mechanism comprises at least one disc spring.

12. A permanent magnet rotor, comprising:
a rotor body having a cylindrical surface and a circumference;
a plurality of permanent magnets disposed on the cylindrical surface at equal intervals of the circumference, each permanent magnet having a pair of angled surfaces;
an adhesive layer disposed between each permanent magnet and the rotor body;
an open-mesh screen disposed between each permanent magnet and the cylindrical surface;
a plurality of magnet retainers, each magnet retainer disposed between a neighboring pair of the permanent magnets, each magnet retainer comprising:
a retainer body having an opening and a pair of angled surfaces each configured to engage one of the angled surfaces of a respective one of the permanent magnets;
a fastening device at least partially disposed in the opening and adapted to engage the rotor body to thereby secure the retainer body to the rotor body; and
a spring mechanism disposed between the fastening device and the retainer body, the spring mechanism exerting a force to secure a respective one of the neighboring pairs of permanent magnets to the cylindrical surface of the rotor body, the force being responsive to a centrifugal force during rotation of the permanent magnet rotor; and
a plurality of axial retainers, each axial retainer disposed at an end of a magnet retainer and being adapted to prevent axial movement of a permanent magnet.

13. The permanent magnet rotor of claim 12, further comprising a compliant layer between the angled surfaces of the retainer bodies and the angled surfaces of the permanent magnets.

* * * * *